Oct. 8, 1929.   H. A. FOOTHORAP   1,730,566
PAPER FEEDING MECHANISM
Filed April 30, 1923   4 Sheets-Sheet 1
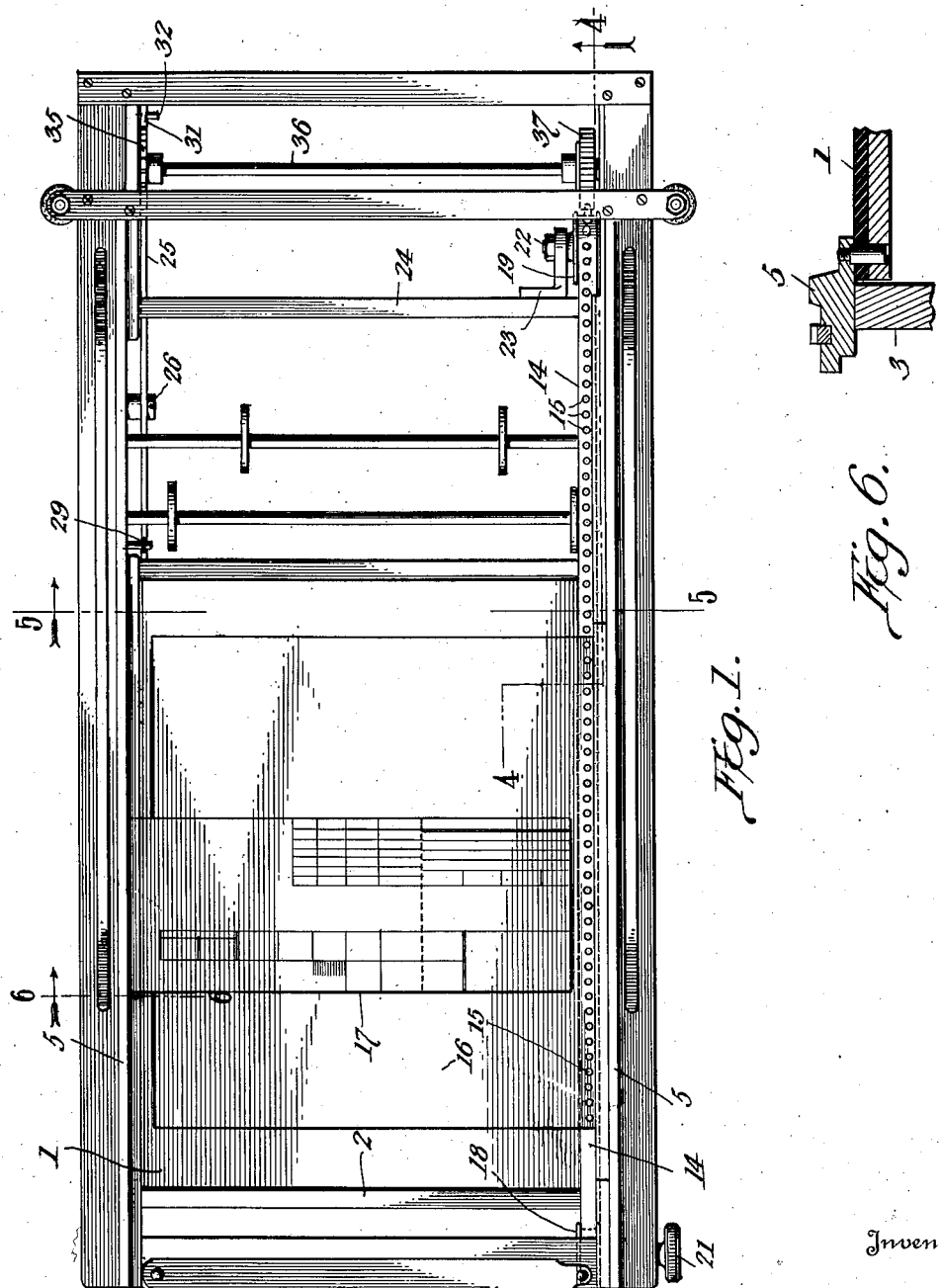

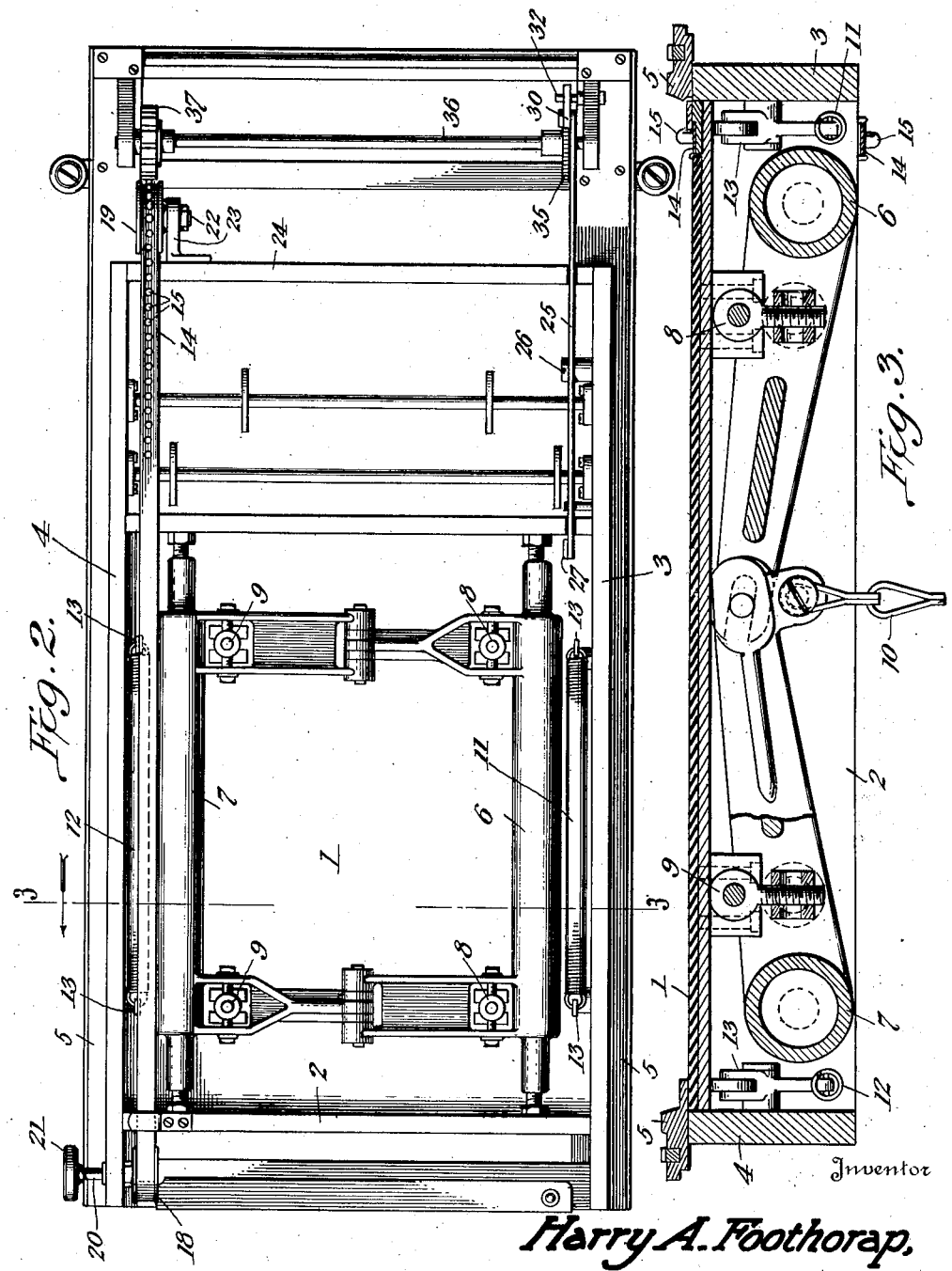

Oct. 8, 1929.  H. A. FOOTHORAP  1,730,566
PAPER FEEDING MECHANISM
Filed April 30, 1923  4 Sheets-Sheet 3
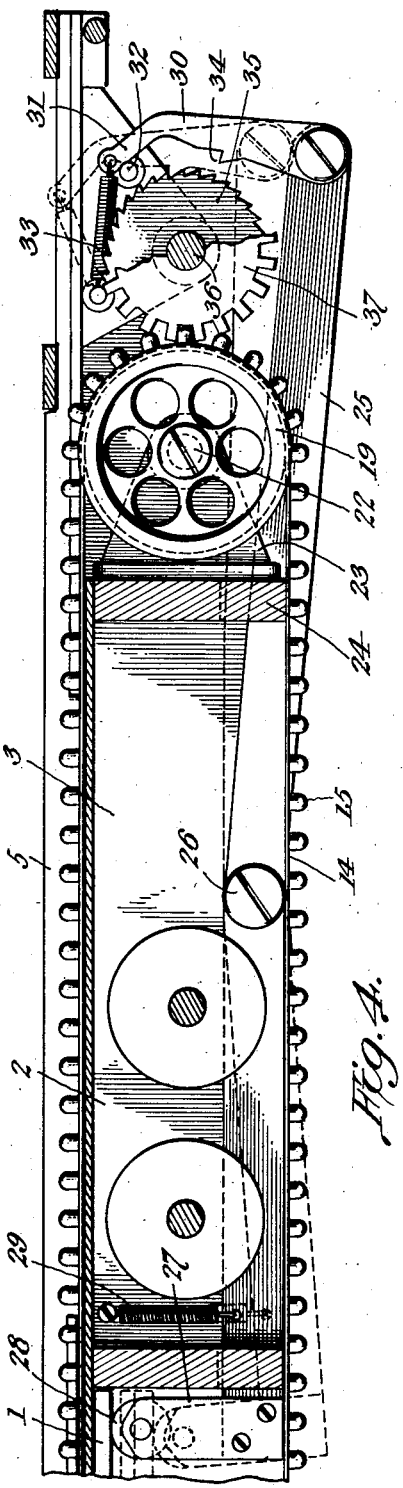
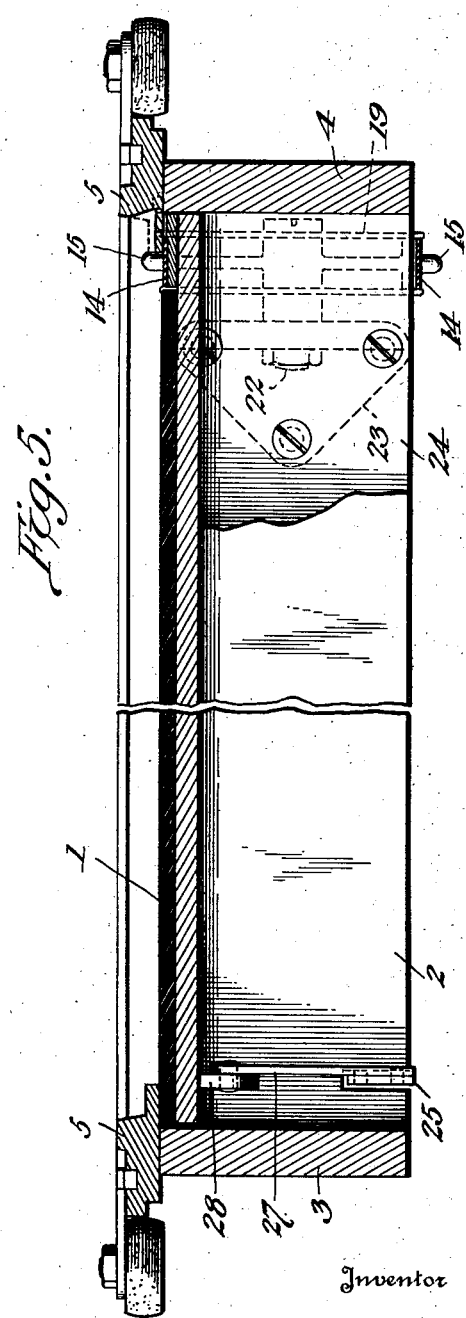
Inventor
Harry A. Foothorap.
By
Attorney Oct. 8, 1929. H. A. FOOTHORAP 1,730,566
PAPER FEEDING MECHANISM
Filed April 30, 1923  4 Sheets-Sheet 4
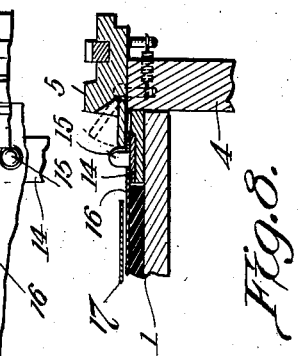
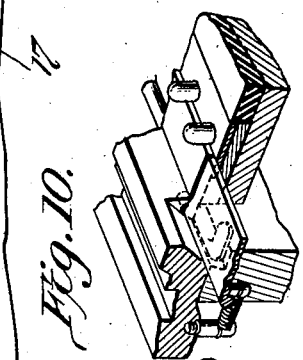
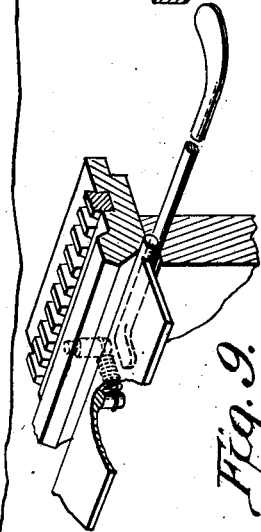
Inventor
Harry A. Foothorap.
By
Attorney Patented Oct. 8, 1929

1,730,566

UNITED STATES PATENT OFFICE

HARRY A. FOOTHORAP, OF HARRISBURG, PENNSYLVANIA, ASSIGNOR TO ELLIOTT-FISHER COMPANY A CORPORATION OF DELAWARE

PAPER-FEEDING MECHANISM

Application filed April 30, 1923. Serial No. 635,678.

This invention relates to paper feeding mechanism, and more particularly to means for automatically feeding a ledger sheet or its equivalent to facilitate the making of what is known as a condensed record.

The object of the invention is to produce an automatic paper feeding means which will advance a condensed record sheet whenever a superposed sheet, as for instance, a bill, is displaced, to the end that as successive bills located at a given point are written upon the record transferred to the subjacent condensed record sheet will appear in proper position upon the latter.

To the accomplishment of the above object, the illustrated embodiment of the invention includes the depressible flat platen of a typewriting machine and an endless paper carrier which retains the record sheet and is moved step by step as the platen is repeatedly depressed to advance the record sheet step by step with relation to the common printing point of a series of bill sheets or the like which are successively placed in position to be printed upon by the typewriter.

In the drawings:

Figure 1 is a plan view of a platen equipped with my invention.

Figure 2 is a bottom plan view of the subject-matter of Figure 1.

Figure 3 is a transverse section on the line 3—3 of Figure 2.

Figure 4 is a large longitudinal section on the line 4—4 of Figure 1.

Figure 5 is a transverse section on the line 5—5 of Figure 1.

Fig. 6 is a detailed section on the line 6—6 of Fig. 1.

Fig. 7 is a plan view showing the relation of the bill and record sheets.

Figure 8, is a section on the line 8—8 of Figure 7.

Figure 9, is a perspective view of a detail, and

Figure 10, is a similar figure of another detail.

1 indicates a flat platen vertically movable in a platen frame 2, as usual in flat platen typewriting machines of what is known as the Elliott-Fisher type. The side members 3 and 4 of the frame 2 are surmounted by tracks or guides 5 for the travelling line space frame of the machine. These tracks or guides 5 extend over the edge of the platen, as shown, so that the paper to be written upon may be clamped against the under side of the rails by the platen when the latter is in its elevated or normal position.

The means whereby the platen is elevated and depressed may be of any desired construction so far as the present invention is concerned. The mechanism shown is substantially like that disclosed in my Patent No. 1,207,152, in so far as the depression of the platen is concerned, a pair of swinging members 6 and 7 being carried by the frame and connected to the platen as at 8 and 9 to depress the platen when the members are swung downward by a treadle or other suitable device (not shown) connected to the swinging members 6 and 7 as by a chain 10. The elevation or retraction of the platen from its depressed position is accomplished by retraction springs 11 and 12 operating upon bell cranks 13 in the manner disclosed in my co-pending application No. 434,250.

The primary element of the paper feeding mechanism is an endless band or tape 14 provided with spaced studs 15 which are designed to engage marginal openings in a condensed record sheet 16 which, as usual, underlies a bill sheet 17, for instance, which is clamped between the platen and the left-hand rail 5. The stud tape 14 has its upper run disposed over the right-hand margin of the platen and is carried around front and rear guide rolls 18 and 19. The front roll 18 is fixed to a shaft 20 afforded a bearing in the side member 4 of the frame, and the outer end of said shaft is provided with a knurled wheel 21 by means of which the front roll 18 may be rotated for the purpose of feeding or adjusting the stud tape by hand. The rear roll 19 is carried by a stub shaft 22 carried by a bracket 23 secured to a transverse frame member 24.

The means whereby the depression of the platen will automatically feed the stud tape and the sheet carried thereby includes a feed lever 25 fulcrumed on the platen frame at 26 and having its upturned front end 27 provided with a roller 28 held against the under surface of the platen 1 by a retracting spring 29. At the opposite end of the lever 25 is pivoted an upstanding feed pawl 30 having at its upper end a cam 31 co-acting with a stud 32 to resist a tendency exerted by a spring 33 to swing the tooth 34 of the pawl into engagement with a ratchet wheel 35. The wheel 35 is mounted at one end of a shaft 36 afforded bearings in the platen frame and carrying at its opposite end a toothed wheel 37 which meshes with or engages the studs 15 spaced about the periphery of the rear guide roll 19. By reference to Figure 4, it will appear that upon the depression of the platen 1, as indicated in dotted lines, to release the bill or other sheet the front end of the feed lever 25 will be depressed, thus elevating the rear end thereof and causing the feed pawl 30 to rise to the position indicated in dotted lines. As the feed pawl rises, the cam 31 will assume such relation to the stud 32 that the feed pawl will be drawn by the spring 33 into engagement with the ratchet wheel 35 and advance the latter a sufficient distance to locate said sheet in position for the next bill which may therefore occupy the same position as the bill which has been displaced.

It is thought that from the foregoing, the construction, operation and advantages of the illustrated embodiment of my invention will be clearly understood, but I reserve the right to effect such modifications as may come within the scope of the protection prayed.

What I claim is:

1. The combination with a vertically movable platen, of a horizontally movable paper feeding device operated thereby.

2. The combination with a depressible flat platen, of means operated thereby for moving a work sheet in the direction of line spacing.

3. The combination with a depressible flat platen, of an endless paper carrier associated therewith and operated thereby to advance or feed a work sheet step by step over the platen.

4. The combination with a depressible flat platen, of a paper carrier associated therewith, manual means for moving the carrier and carrier feeding means controlled by the platen.

5. The combination with a vertically movable flat platen, of an endless paper carrier and means whereby repeated movements of the platen will cause a step by step paper feeding movement of the carrier.

6. The combination with a fixed clamping member, of a platen movable toward and from said member to clamp and release a work sheet, of an endless carrier for a second work sheet and means automatically operated to advance the carrier upon the movement of the platen to release the sheet first named.

7. The combination with relatively separable paper clamps, of an endless paper carrier equipped with paper engaging devices, and feeding the paper relative to the clamps, and means for rendering the clamps and paper carrier inter-dependent in operation.

8. The combination with a paper clamp, one element of which is a platen supporting a paper sheet retained on the platen by the clamp, an endless paper carrier operative to feed a second sheet over said platen, and means whereby, when the clamp is operated to release the first named sheet, the endless paper carrier will be moved to feed the second sheet to a new printing position.

9. The combination with a flat platen movable toward or from the writing plane, of paper feeding mechanism including devices having travelling movement over the platen, and means for effecting travelling movement of said devices by movement of the platen in one direction.

10. The combination with a movable flat platen, of a clamping member cooperating with one side edge of the platen to clamp a work sheet thereon, devices having travelling movement over the opposite side edge of the platen to feed another sheet thereover in a line spacing direction, and means for effecting travelling movement of said devices by movement of the platen.

In testimony whereof I hereunto affix my signature.

HARRY A. FOOTHORAP.